United States Patent [19]

Cox

[11] Patent Number: 4,754,565

[45] Date of Patent: Jul. 5, 1988

[54] DISTRESS SIGN

[76] Inventor: Billy G. Cox, Rte. 2, Box 597, Lake City, Tenn. 37769

[21] Appl. No.: 109,923

[22] Filed: Oct. 19, 1987

[51] Int. Cl.⁴ .............................................. G09F 21/04

[52] U.S. Cl. ........................................ 40/591; 116/20; 40/643; 40/658 RD

[58] Field of Search ...................... 40/124.1, 10, 11 R, 40/10 A, 591; 116/28

[56] References Cited

U.S. PATENT DOCUMENTS

| | | | |
|---|---|---|---|
| 2,637,128 | 5/1953 | Weeks | 40/11 R |
| 2,976,629 | 3/1961 | Brixius et al. | 40/11 R |
| 3,024,552 | 3/1962 | MacLea | 40/129 |
| 3,430,374 | 3/1969 | Woodard | 40/491 |
| 3,509,653 | 5/1970 | Hummel | 40/11 R |
| 3,738,039 | 6/1973 | DeFuria | 40/129 |
| 4,002,138 | 1/1977 | Dobala | 116/28 R |
| 4,015,557 | 4/1977 | Schu Lein | 40/491 |
| 4,292,749 | 10/1981 | Thomas | 40/11 R |
| 4,348,978 | 9/1982 | Brucato | 116/28 R |
| 4,375,134 | 3/1983 | Sheetz | 40/591 |
| 4,519,153 | 5/1985 | Moon et al. | 40/591 |
| 4,700,655 | 10/1987 | Kirby | 40/610 |

FOREIGN PATENT DOCUMENTS 2124008A 2/1984 United Kingdom .

*Primary Examiner*—Gene Mancene
*Assistant Examiner*—Wenceslao J. Contreras
*Attorney, Agent, or Firm*—Luedeka, Hodges & Neely

[57] ABSTRACT

A distress sign which is adapted for placement on the upper edge of a vertically movable window of a vehicle. The sign includes a pair of elongate, substantially rigid display panels each having upper and lower marginal edges and end edges. The panels are connected together along their upper marginal edges by a substantially rigid spine panel. A hook entends downwardly from one end of the spine panel and is spaced from the end edges of the panels to provide a slot in which the upper edge of the window is received, and is configured to engage the adjacent end edges of the panels against the surface of the window when the upper edge of the window is received in the slot.

7 Claims, 2 Drawing Sheets

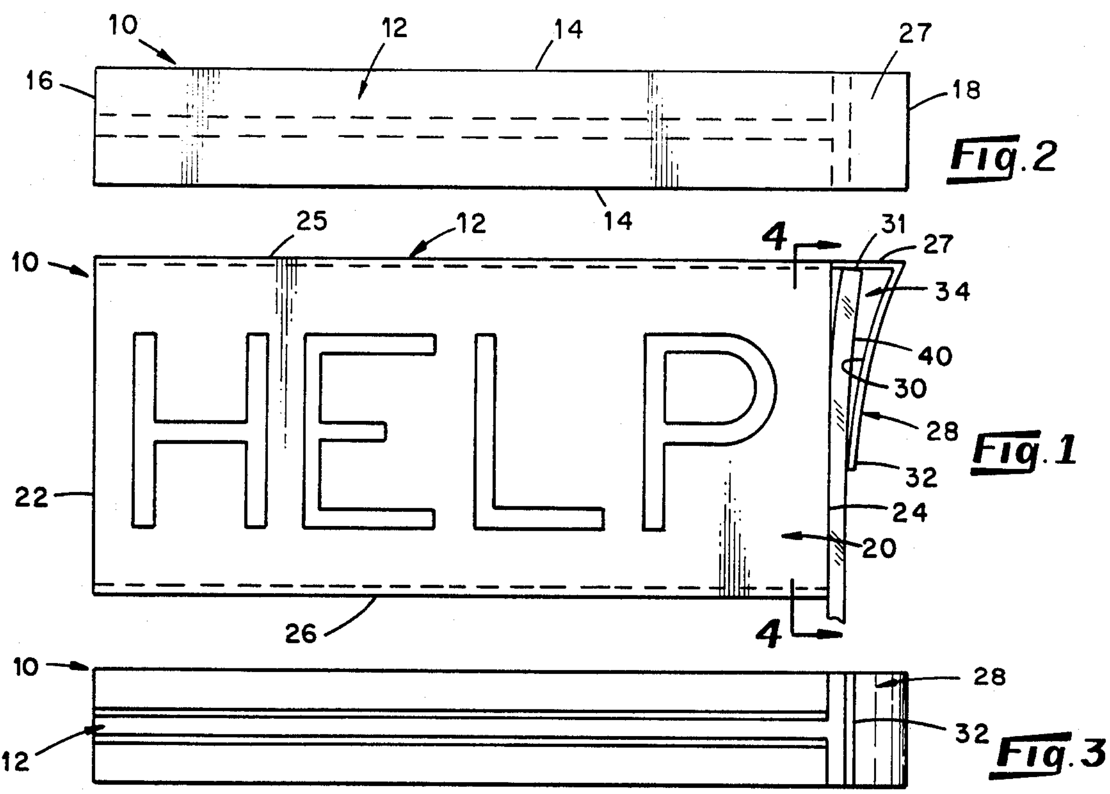
10
12
14
27
16
18
Fig. 2
25
12
14
31
27
4
34
40
30
28
32
24
20
22
26
4
HELP
Fig. 1
10
28
32
12
Fig. 3
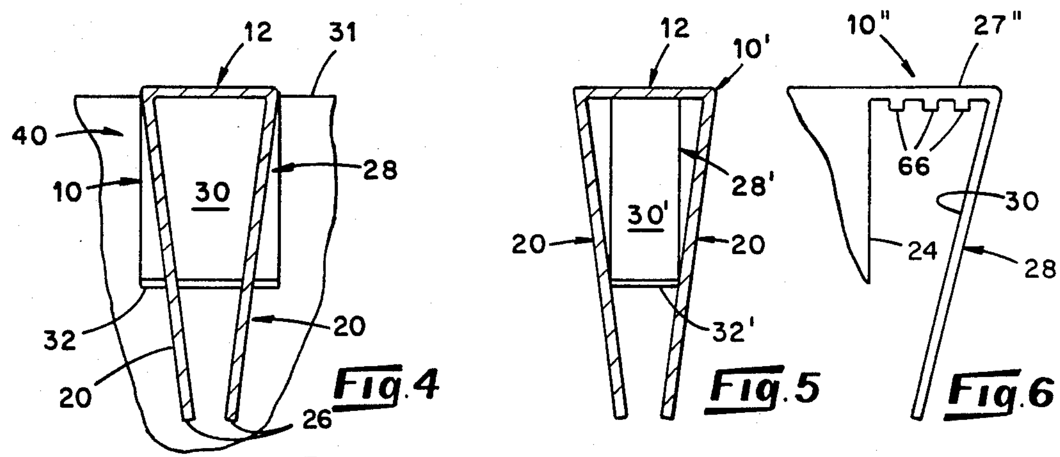
12
31
40
10
30
28
32
20
20
26
Fig. 4
12
10'
28'
30'
20
20
32'
Fig. 5
10"
27"
66
30
24
28
Fig. 6
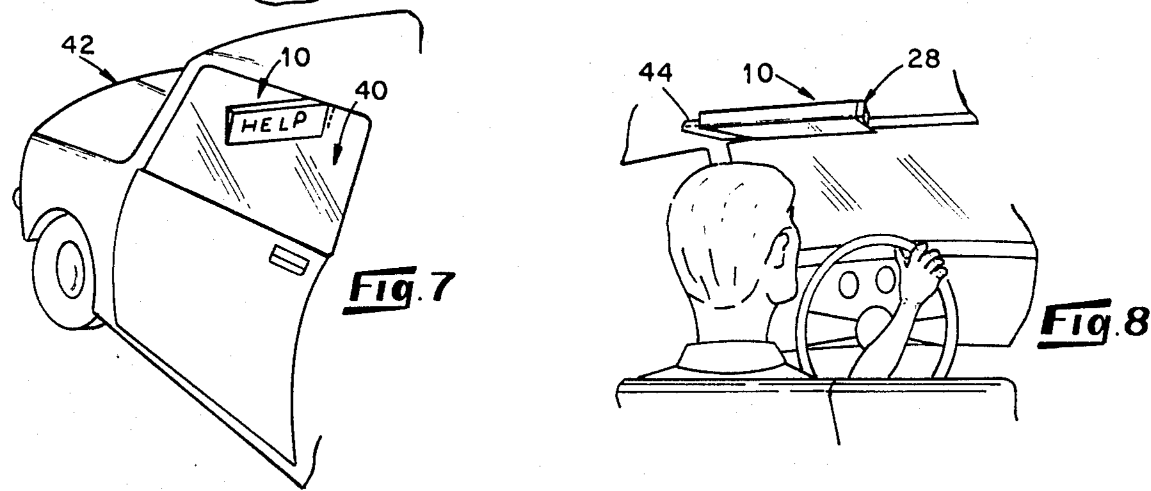
42
10
40
HELP
Fig. 7
44
10
28
Fig. 8

DISTRESS SIGN

The present invention relates to distress signs for vehicles and more particularly relates to a distress sign for placement between the upper edge of a vertically movable vehicle window and the vehicle frame against which the window is normally urged when in its raised position.

Known distress signs for use on the windows of vehicles typically fit over the upper edge of the window and extend out from the window displaying some form of distress signal such as the word "HELP", for example. For the most part, these signs have proven less than satisfactory due to their instability against the influence of wind generated by passing motorists.

Some prior art devices have employed extra support for the signs in an attempt to alleviate instability problems. However, these extra provisions make the signs more complicated and expensive to manufacture, and are therefore undesirable. In addition, known distress signs do not lend themselves to convenient storage since they typically include several separate parts.

Another difficulty which has become more evident in recent times is that the windows of modern vehicles curve inwardly at the top so that a distress sign hooked over the upper edge of the window tends to project upwardly. It is desirable that a distress sign project out from the window in a substantially horizontal disposition.

Accordingly, it is an object of the present invention to provide a distress sign for use on vehicles.

It is another object of the invention to provide a distress sign of the character described which is stable against the influence of wind generated by passing motorists.

An additional object of the invention is the provision of a distress sign for vehicles which is adapted for convenient storage inside the vehicle compartment.

A further object of the invention is the provision of a distress sign of the character described which is adapted to enable substantially horizontal disposition of the sign even with modern window configurations.

Still another object of the invention is the provision of a distress sign of the character described which is simple in construction lending itself to manufacture by known techniques from readily available, inexpensive materials.

The above and other objects and advantages of the present invention will be better understood and will be further described in the following detailed description in conjunction with the accompanying drawings in which:

FIG. 1 is a front, elevational view of a distress sign placed on the upper edge of a vertically movable window of a vehicle illustrating features of one embodiment of the present invention;

FIG. 2 is a top or plan view of the sign shown in FIG. 1 with the vehicle window omitted for the purpose of clarity;

FIG. 3 is a bottom view of the sign shown in FIG. 1 with the vehicle window omitted for the purpose of clarity;

FIG. 4 is a view along line 4—4 of the sign shown in FIG. 1;

FIG. 5 is a view as in FIG. 4 illustrating another form of the sign of the present invention;

FIG. 6 is a fragmentary front view of an additional embodiment of a distress sign in accordance with the present invention;

FIG. 7 is a diagrammatic perspective view illustrating use of a distress sign constructed in accordance with the present invention on the side window of a vehicle;

FIG. 8 is a diagrammatic view of the interior of a vehicle illustrating storage of a distress sign constructed in accordance with the present invention on the sun visor of the vehicle;

Figure 9:
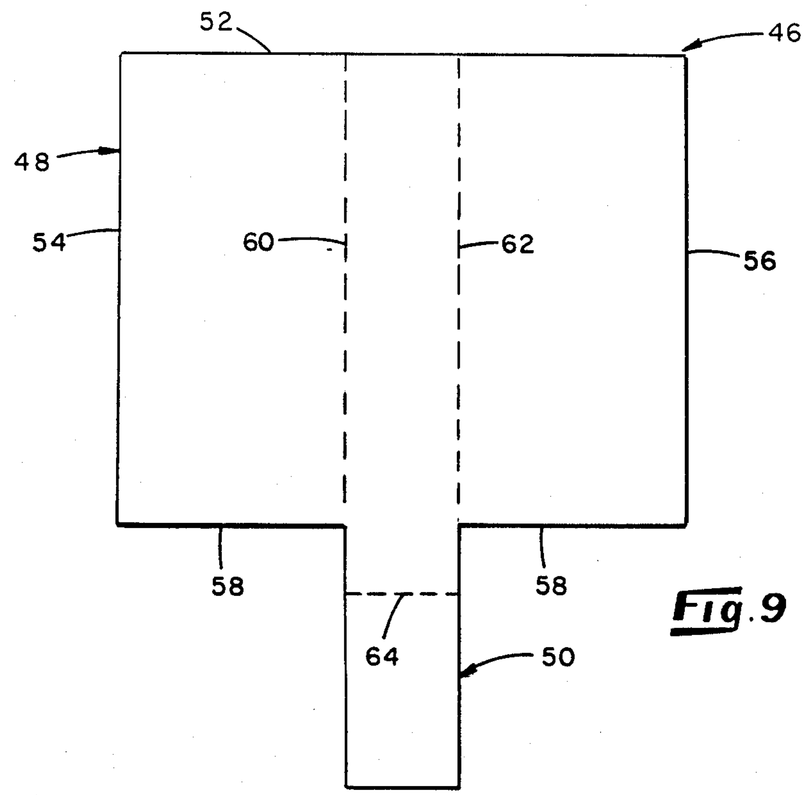
FIG. 9 is a plan view illustrating a blank from which a sign is constructed in accordance with the invention.

In accordance with the more general features of the present invention, a distress sign is provided for use on vehicles and is adapted for placement over the upper edge of a vertically movable window of the vehicle between the upper edge of the window and a vehicle frame against which the window is normally urged when in its raised position. Typically, the window is a side window and the frame against which the window is urged in its raised position is a downwardly facing groove or molding which is a part of the roof or of the door supporting the window. Normally, the groove or molding includes rubber or other resilient sealing means which embraces the upper edge of the window to prevent leakage.

The sign comprises a pair of elongate substantially rigid display panels each having upper and lower marginal edges, and end edges. An elongate substantially rigid spine panel connects the display panels together along their upper marginal edges and at least one of the display panels carries an indicia. The display panels are disposed to converge towards one another in the direction of their lower marginal edges so that the sign has a generally triangular crosssection. A hook extends downwardly from one end of the spine panel and is spaced from the adjacent end edges of the panels to provide a slot which is proportioned to receive the upper edge of the window. The hook is configured to engage the adjacent end edges of the display panels against the surface of the vehicle window when the upper edge of the window is received in the slot.

When the window is raised, the hook is engaged between the upper edge of the window and the vehicle frame. Deflection of the panels due to the wind generated by passing motorists is substantially prevented by the rigidity of the panels and the engagement of the end edges of the panels against the surface of the window.

Further features of the distress sign of the present invention will now be described with reference to the figures in which like reference characters designate like or similar parts throughout the several views. With initial reference to FIGS. 1 through 4, a distress sign generally designated at 10 incorporates features of one embodiment of the invention and includes an elongate substantially rigid spine 12 defining the top of the sign 10 as shown in FIG. 1. The spine 12 is preferably rectangular in configuration and includes marginal edges 14, an outer end edge 16, and an inner edge 18, and may carry indicia as will be described.

As used herein, the term "substantially rigid" is intended to mean that the material of construction is able to support itself in a predetermined configuration and to remain substantially in this configuration against the influence of bending forces such as those imposed by the wind typically encountered under highway conditions. Yet, the material should be sufficiently resilient to enable temporary deformation for purposes which will be described below and biased to return to the original configuration.

Display panels 20 extend downwardly as viewed in FIG. 1 from the marginal edges 14 of the spine 12 and like the spine are substantially rigid. The panels 20 each include an outer end edge 22, an inner end edge 24, an upper marginal edge 25 which is connected to the marginal edges 14 of the spine 12, and a lower marginal edge 26. The panels 20 are preferably rectangular, have substantially the same dimensions, and are positioned with respect to one another so that the outer end edges 22 define an outer end edge plane and the inner end edges 24 define an inner end edge plane, both planes being substantially perpendicular to the planes of the panels.

As best seen in FIGS. 3 and 4, the panels 20 are generally parallel but converge somewhat towards their lower marginal edges 26 so that the same are disposed closely adjacent or in contact with one another. The panels 20 are biased to remain in their converging relationship, but are resiliently spreadable for a purpose to be described.

In one form of the invention, the sign is hooked over an upper edge 31 of a vehicle window 40 through the provision of a spine extension 27 as shown in FIG. 1 which disposes an end edge 18 of the spine at a laterally spaced position with respect to the inner end edges 24 of the panels. A tongue 28 extends downwardly from the end edge 18 of the spine 12 and defines a bearing surface 30 which is disposed to face the end edges 24 of the panels 20. The tongue 28 terminates in a lower edge 32 spaced from the spine 12 and is preferably configured to converge towards the end edges 24 in the direction of its lower edge 32.

A gap or slot 34 is defined between the bearing surface 30 of the tongue 28 and the end edges 24 of the panels 20, in which the upper edge 31 of the vehicle window 40 is received. It is noted that the lower edge 32 of the tongue 28 is positioned closely adjacent or in contact with the end edges 24 of the panels 20. Also, the tongue 30 is preferably resiliently biased toward the end edges 24 in order to enable insertion of the upper edge 31 in the gap 34 and, depending on the spacing between the lower edge 32 and the end edges 24, to ensure that at least some portion of the bearing surface 30 bears against the inside surface of the window when the edge is positioned in the gap 34. Furthermore, it is noted that the end edges 24 in the illustrated embodiment are engaged against the outer surface of the window 40 in a manner which supports the panels 20 in an outwardly disposed orientation relative to the window. Thus, the sign is supported against deflection or pivotal movement in a direction generally perpendicular to the planes of the panels, as may be induced by the wind generated from passing vehicles, for example.

The spine extension 27 is preferably dimensioned to provide variability in terms of the location along the extension against which the upper edge 31 of the window 40 is placed. That is, conventional automobile windows typically have a thickness along their upper edge of about $\frac{1}{4}$ inch and it is preferred that the extension be substantially longer than this so that the space between the window edge and the end edges 24 can be adjusted in order to maintain a substantially horizontal disposition of the panels 20 when the window, at its upper end, curves or leans inwardly as is the case with many modern automobiles. The horizontal disposition is that which disposes the indicia carried on the panels 20 such as the word "HELP" (shown in FIG. 1) along a substantially horizontal line.

A suitable length of the extension is about $1\frac{1}{4}$ inches which provides a wide degree of variability of the spacing between the upper edge of the window and the end edges 24. It is noted that at any position of the upper edge 31 along the length of the extension 27, the bearing surface 30, the tongue 28 and the inner end edges 24 of the panels 20 will preferably be in contact with the inner and outer surfaces of the window, respectively, and thus provide stability against deflection of the panels 20 due to the effect of wind or gusts generated by passing motorists.

FIG. 7 illustrates placement of the distress sign 10 on the window 40 of a conventional automobile 42. Although not visible in the figure, the extension 27 of the spine 14 is engaged between the upper edge 31 of the window 40 and the frame of the vehicle 42 against which the window 40 is urged in its raised position. The window 40 curves inwardly adjacent its upper edge 31 and the panels 20 are placed in a substantially horizontal position by adjusting the location of the upper edge of the window on the extension of the spine 12 as mentioned above.

As shown in FIG. 8, the distress sign 10 is conveniently adapted for storage in the vehicle compartment on the overhead sun visor 44. In this regard, it is preferred that the width of the spine 12 between the edges 14 be about, but greater than, the thickness of conventional sun visors. In addition, it is preferred that the length of the spine 12 be about but slightly less than, the length of conventional sun visors. To place the sign 10 over the visor 44 for storage, it is necessary only to spread the panels 20 sufficiently to enable insertion of the visor edge between the panels 20. The sign is pushed onto the visor and slid lengthwise until the tongue 28 engages the end of the visor. In this manner, the sign is not likely to be dislodged from the visor 44 and is readily available for use. It is also noted that the surface of the spine 12 may carry indicia such as advertising, for example, as mentioned above.

It will be appreciated that the sign 10 can be manufactured from inexpensive plastic materials which are substantiallly rigid as described above, and that the uncomplicated nature of the sign facilitates its manufacture by simple, economical methods. For example, as shown in FIG. 9, the sign is conveniently manufactured by providing a flat blank 46 formed of a suitable plastic material which includes a larger, preferably rectangular section 48 and an appendage 50. A first edge 52 of the section 48 shown on the upper side of the blank 46 in FIG. 9 corresponds in dimension to the combined dimensions of the outer end edges 22 of the panels 20 and the outer end edge 16 of the spine 12. A second edge 54 of the section 48 shown on the left-hand side of the blank 46 in FIG. 9 has a dimension corresponding to the dimension of the lower marginal edge 26 of the panels 20 as does a third edge 56 of the section 48 shown on the right-hand side of the section 48 in FIG. 9. The appendage 50 extends from a fourth edge 58 of the section 48 on the opposite side thereof from the first edge 52 and is preferably located so that its midpoint coincides with the midpoint of the fourth edge 58. The dimension of the portions of the fourth edge 58 extending between the appendage 50 and the second and third edges 54 and 56 corresponds to the dimension of the inner end edges 24 of the panels 20. The length of the appendage 50, that is, its extension from the section 48, corresponds in dimension to the combined dimensions of the extension 27 of the spine 12 and the length of the tongue 28. Also, the width of the appendage 50 preferably corresponds to the width of the spine 12.

Referring now to FIG. 9 together with FIGS. 1 through 4, the sign 10 is formed from the blank 46 by folding the section 48 along parallel fold lines 60 and 62 to produce the panels 20 and spine 12 with the panels 20 extending from the side marginal edges 14 of the spine 12 which correspond to the fold lines 60 and 62. The tongue 28 is formed by folding the appendage 50 along line 64 which is spaced from the fourth edge 58 by the desired dimension of the extension 27 of the spine 12. It will be appreciated that in order to dispose the panels 20 in a converging relationship, the angle through which the portions of the section 48 are folded is preferably substantially greater than 90° and that a permanent bias of the panels 20 toward the converging relationship can be imposed by accompanying the folding process with sufficient heating, for example. The same is true with regard to the formation of the tongue 28 in order to dispose the bearing surface 30 in a converging relationship with the end edges 24 of the panels 20.

Thus, it is seen that the sign 10 can be manufactured in a few, relatively simple steps which can be accomplished using conventional folding and/or molding equipment. Furthermore, it will be appreciated that other techniques are available for manufacturing the sign 10 such as injection molding, extrusion, or vacuum forming, for example.

FIG. 5 illustrates another form of the sign 10'. Basically, the configuration of the sign 10' in terms of the panels 20 and spine 12 is identical to that of the sign 10. The difference is in the provision of a modified tongue 28' which has a reduced width as compared to the tongue 28 of FIGS. 1 through 4 so that the lower edge 32' of the tongue 28' does not project out beyond the surfaces of the panels 20 when viewed from the end as in FIG. 5.

FIG. 6 illustrates another form of the sign 10" which differs from that shown and described above with reference to FIGS. 1 through 4 by the provision of spaced apart ridges 66 formed on the undersurface of a modified spine extension 27". The other portions of the sign 10" are the same as that of the sign 10 of FIGS. 1 through 4.

The ridges 66 preferably extend substantially parallel to the plane containing the end edges 24 of the panels and are spaced apart by a distance approximately equal to the expected thickness of the upper edge 31 of the window 40 (The window 40 and its upper edge 31 are omitted in FIG. 6 for clarity.). In addition, the ridge 66 located closest to the end edges 24 is spaced therefrom by a distance approximately equal to the expected thickness of the upper edge 31 of the window 40. The same spacing exists with regard to the ridge 66 located closest to the tongue 28 between the ridge and the bearing surface 30 of the tongue. The ridges 66 provide a means by which movement of the upper edge 31 of the window 40 is restricted along the spine extension toward or away from the tongue 28 from a predetermined position. That is, by positioning the upper edge of the window in a desired one of the spaces between adjacent ridges or between a ridge and either the end edges 24 of the panel 20 or the bearing surface 30 of the tongue 28, movement of the upper edge of the window to the adjacent space is restricted by the presence of one or more ridges.

Figure 10:
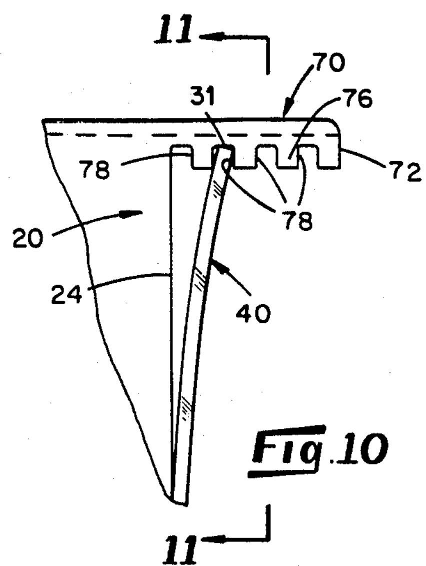
FIG. 10 is a fragmentary front view of an additional embodiment of a distress sign in accordance with the present invention.
Figure 11:
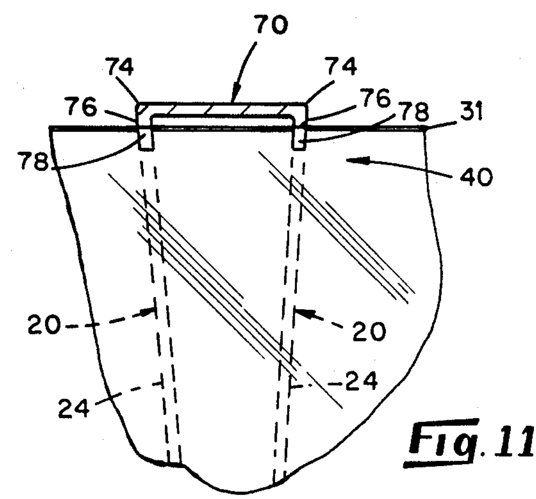
FIG. 11 is a view along line 11—11 of the sign shown in FIG. 10.

Another embodiment of the invention is shown in FIGS. 10 and 11. The sign 10''' of these figures is identical to that of the sign of FIGS. 1 through 4 in terms of the panels 20 and spine 12. The difference is in the manner in which the sign 10''' is hooked over the upper edge 31 of the window 40.

As best seen in FIG. 10, a spine extension 70 terminates in an end edge 72 spaced from the end edges 24 of the panels 20. The extension 70 is folded downwardly adjacent its marginal edges 74 to define edge strips 76 lying approximately in the planes of the panels 20 as shown in FIG. 11. Spaced apart grooves 78 are provided in each of the strips 76 adjacent the end edges 24 of the panels 20. The grooves 78 in one strip 76 are aligned with the grooves in the other strip 76 and each set of aligned grooves is proportioned to receive the upper edge 31 of the window 40.

The upper edge 31 of the window 40 is placed in a selected one of the pairs of aligned grooves 78 depending on the curvature of the window adjacent its upper edge to engage the end edges 24 of the panels 20 against the outer surface of the window while disposing the panels in a substantially horizontal position. It will be appreciated that the grooves 78 in the strips 76 also provide a means by which displacement of the upper edge of the window from a predetermined spacing with respect to the end edges 24 of the panels 20 is restricted similar to the ridges 66 described above with reference to FIG. 6.

Although preferred embodiments of the present invention have been shown and described in the foregoing detailed description, it will be understood that the invention is capable of numerous rearrangements, modifications and substitutions without departing from the scope of the invention as set forth in the following claims.

What is claimed is:

1. A distress sign for use on vehicles, the sign being adapted for placement over the upper edge of a vertical movable window of the vehicle between the upper edge of the window and a vehicle frame against which the window is normally urged when in its raised position, comprising a pair of elongated substantially rigid display panels each having upper and lower marginal edges, and end edges, an elongate substantially rigid spine panel connecting said display panels together along their upper marginal edges, at least one of said display panels carrying an indicia, said display panels being disposed to converge towards one another in the direction of their lower edges so that the sign has a generally triangular cross-section, and hook means extending downwardly from one end of said spine panel and spaced from the adjacent end edges of said panels to provide a slot which is proportioned to receive the upper edge of the window and being configured to engage the adjacent end edges of said display panels against the surface of the vehicle window when the upper edge of the window is received in said slot.

2. The sign of claim 1, wherein said hook means comprises an extension of said spine panel against which the upper edge of the window is placed, said extension terminating in an end edge which is spaced from the adjacent end edges of said panels by a distance greater than the thickness of the window, said distance being sufficient to enable adjustment of the position of the upper edge of the window against said extension to a position at which said panels are disposed substantially horizontally, and means provided on said extension for restricting movement of the upper edge of the window along said extension toward or away from the adjacent side edges of said panels from a predetermined position.

3. The sign of claim 1, wherein said hook means comprises an extension of said spine panel which is folded down along its side edges to define depending strips and a plurality of spaced apart downwardly opening grooves in each of said strips, the grooves in each of said strips being aligned with the grooves of the other strip and being proportioned to receive the upper edge of the window in a selected pair of aligned grooves.

4. The sign of claim 1, wherein said panels are unconnected at their lower edges and are resiliently biased to converge in the direction of their lower marginal edges to dispose said lower edges closely adjacent one another to facilitate storage of the sign over a vehicle sun visor by spreading said lower edges of said panels, inserting the sun visor between said panels, and releasing said lower edges, so that the sun visor is engaged between said panels.

5. The sign of claim 4, wherein said spine panel carries indicia.

6. The sign of claim 1, wherein said spine panel carries indicia.

7. The sign of claim 1, wherein said hook means comprises an extension of said spine panel against which the upper edge of the window is placed, said extension extending out beyond said contact means a distance greater than the thickness of the window, said distance being sufficient to enable adjustment of the position of the upper edge of the window against said extension to a position at which said panels are disposed substantially horizontally, and at least one ridge disposed on the side of said extension adjacent said end edges facing said slot and configured to restrict movement of the upper edge of the window along said extension past said ridge.

* * * * *